US005773507A

United States Patent [19]
Incorvia et al.

[11] Patent Number: 5,773,507
[45] Date of Patent: Jun. 30, 1998

[54] ANTI-STATIC COMPOSITION AND PROCESS FOR MAKING SAME

[75] Inventors: Michael J. Incorvia, Lansdale; Stephen A. Fischer, Yardley, both of Pa.

[73] Assignee: Henkel Corporation, Plymouth Meeting, Pa.

[21] Appl. No.: 519,324

[22] Filed: Aug. 25, 1995

[51] Int. Cl.⁶ .................................................... C08L 51/00
[52] U.S. Cl. .................. 524/538; 524/539; 523/404; 523/414; 525/408; 525/423; 525/430
[58] Field of Search .................. 523/414, 404; 524/538, 539; 260/DIG. 15, DIG. 17, 18, 19–21; 525/408, 423, 430

[56] References Cited

U.S. PATENT DOCUMENTS

| | | | |
|---|---|---|---|
| 3,108,011 | 10/1963 | Frotscher | 117/62.2 |
| 3,510,452 | 5/1970 | Frotscher et al. | 760/46.5 |
| 3,901,715 | 8/1975 | Callahan et al. | 106/2 |
| 4,069,159 | 1/1978 | Hayek | 252/8.8 |
| 4,144,123 | 3/1979 | Scharf et al. | 162/164 |
| 4,371,674 | 2/1983 | Hertel et al. | 525/435 |
| 4,859,246 | 8/1989 | Sennett | 106/487 |
| 5,017,642 | 5/1991 | Hasegawa et al. | 524/608 |
| 5,019,606 | 5/1991 | Marten et al. | 523/414 |
| 5,371,119 | 12/1994 | Bohlander et al. | 523/414 |
| 5,536,370 | 7/1996 | Scherr et al. | 162/164.3 |
| 5,641,855 | 6/1997 | Scherr et al. | 528/310 |

*Primary Examiner*—Randy Gulakowski
*Attorney, Agent, or Firm*—Ernest G. Szoke; Real J. Grandmaison; Henry E. Millson

[57] ABSTRACT

An antistatic composition containing a crosslinked thermosetting resin formed by reacting, in the presence of a water-soluble solvent, (a) a polyaminoamide having unreacted primary and secondary amine groups and (b) a polychlorohydrin derivative.

25 Claims, No Drawings

5,773,507

ANTI-STATIC COMPOSITION AND PROCESS FOR MAKING SAME

FIELD OF THE INVENTION

The present invention generally relates to an anti-static composition for polymeric materials. More particularly, by cross-linking a polyaminoamide with a polychlorohydrin derivative, an anti-static composition is formed which, when applied onto a polymeric substrate permanently imparts anti-static properties onto the substrate.

BACKGROUND OF THE INVENTION

The production of static electricity on polymeric materials caused by the accumulation of electrical charge thereon creates problems. Both natural and synthetic polymeric fibers have a tendency to accumulate electrical charge, resulting in the production of static electricity. Numerous methods have been proposed to prevent such electrification. Examples include the application of a surfactant having antistatic properties onto the surfaces of polymeric substrates. The antistatic effects of such surfactants, however, has proven to be only temporary due to their lack of durability, anti-stat properties can be lost during the dyeing process, or during cleaning or by mechanical damage. It has also been proposed that an antistatic agent be incorporated directly into a polymeric substrate during its formation, while at the same time attempting to maintain the fiber's spinnability and quality of construction.

It is common knowledge that fibers prepared from conventional natural and synthetic polymeric materials tend to collect and retain, for periods of time, static electrical charges when coming into contact with each other or foreign objects. The electrostatic charge build-up can occur quite rapidly and often dissipation of the charge into the environmental atmosphere is extremely slow. A consequence of this is that the polymeric material may remain electrostatically charged for hours at a time. This property tends to make filaments difficult to handle during manufacturing operations and results in objectionable fiber properties, particularly in wearing apparel and carpeting. Electrostatically charged polymeric textile materials may not only attract each other, but may also attract such things as dust, dirt, and lint. In general, however, electrostatically charged polymeric substrates, regardless of their form such as, for example, carpeting, plastic packing materials, etc, benefit from dissipation of static charge with respect to their ease of use, appearance and safety.

The accumulation of static charges and the slow dissipation thereof on polyamide fibers prevents finished, polymeric fabrics from draping and wearing in a desirable manner, and causes the same to cling uncomfortably to the body of the person wearing them. Fibers having a high electrostatic susceptibility often cling to guides and rolls in textile machinery during the manufacturing and processing thereof and are sometimes seriously damaged and weakened. As a result, the quality of the end product is lower than it might otherwise be. For these reasons, and because end-uses such as garments, upholstery, hosiery, rugs, blankets and fabrics are greatly benefited by a reduced tendency to accumulate and maintain electrostatic charges, a permanent antistatic composition to be applied thereon is highly desirable.

Presently, in the commercial production of natural and synthetic polymeric fibers, the as-spun filaments are given some treatment to improve their electrostatic and handling properties. This treatment usually consists of passing the filaments, while in the form of a bundle, through a bath or over a wheel coated with a treating of finishing liquid. The finish thus applied is a coating and is not of a permanent nature. Most, if not all, of the antistatic agent on the fiber surface is lost in subsequent processing of the filament by mechanical handling, heating, washing, scouring and dyeing. If the antistatic agent does remain on the fiber until the final end product is produced, it often becomes less effective after the end product is used for a period of time, and especially after a number of washings or dry cleaning operations.

Efforts have been made in the past to produce permanent antistatic polymeric fibers and articles by the application of a more permanent coating. However, due to the harsh finishing applications the coated fibers were subsequently exposed to, the coatings would either be removed and/or fail to perform adequately. It has also been attempted to incorporate antistatic type comonomers directly into the base polymeric materials. For various reasons, however, such as a resulting harsh fiber surface or sacrifice of good fiber physical properties, these methods have been proven unsuccessful.

Antistatic compositions are also used for enhancing the receptivity of plastic surfaces to electrostatically applied coatings, e.g., in automobile production. In this application it is also desirable that the antistatic composition resist removal when exposed to an aqueous rinse or wash liquid.

Accordingly, it is a primary object of the present invention to provide novel compounds capable of dissipating electrical charges.

Another object of the invention is to provide a process for imparting permanent antistatic properties onto natural and synthetic polymeric substrates.

SUMMARY OF THE INVENTION

The present invention is directed to a new and novel antistatic composition capable of being permanently affixed to a polymeric material, the antistatic composition containing a crosslinked thermosetting resin formed by reacting, in the presence of a water-soluble solvent, (a) a polyaminoamide having unreacted primary and secondary amine groups, and (b) a polychlorohydrin derivative.

There is also provided a process for making an antistatic composition involving the steps of (a) forming a polyaminoamide having unreacted primary and secondary amine groups, and (b) reacting, in the presence of a water-soluble solvent, said polyaminoamide with a polychlorohydrin derivative.

The present invention also provides a process for permanently affixing an antistatic composition onto a natural and synthetic polymeric substrate comprising contacting said substrate with an antistatic composition containing a crosslinked thermosetting resin formed by reacting, in the presence of a water-soluble solvent, (a) a polyaminoamide having unreacted primary and secondary amine groups, and (b) a polychlorohydrin derivative.

The composition and process of the present invention are also useful for dissipating an electrostatic charge on a static prone natural or synthetic polymeric substrate, thereby imparting a desired level of surface conductivity onto formed plastic articles, such as automobile bumper parts, for electrostatically applied coating materials, resulting in good adhesion of the coating material onto the treated article.

DESCRIPTION OF THE INVENTION

Other than in the operating examples, or where otherwise indicated, all numbers expressing quantities of ingredients or reaction conditions used herein are to be understood as being modified in all instances by the term "about".

The composition of the present invention is formed by crosslinking a polyaminoamide with a polychlorohydrin derivative.

The polyaminoamide of the present invention is preferably formed by reacting a polyamine with a polyacid. The amine groups of the polyamine are primary and/or secondary amine functional groups and can be present as part of the polymer backbone, polymer endgroups or pendent branches to the main polymer chain. Suitable polyamines include, for example, diethylenetriamine, triethylenetetramine and tetraethylenepentamine. Particularly preferred polyamines are diethylenetriamine and triethylenetetramine.

Suitable polyacids include, for example, malonic acid, succinic acid, glutaric acid, adipic acid and sebacic acid. A particularly preferred polyacid is adipic acid.

Thus, by reacting a polyamine with a polyacid, a suitable polyaminoamide may be formed. Optionally, reactants such as $C_{36}$ dimer and $C_{54}$ trimer acids, methyl esters of fatty alcohol ethoxylates (oxa-acids), amine terminated EO homopolymers or EO-PO block copolymers (JEFFAMINES®) can be added in amounts of up to 50% by weight on reactants. Other useful polymers which may also optionally be added or used in place of the polyaminoamide in reacting with the polychlorhydrin derivative include polyethylenimine, poly-N-vinylamine, polyallylamine, polydiallylamine, copolymers of polyvinylalcohol-vinylamine, and vinyl addition copolymers containing polyallylamine or polydiallylamine functionalities.

The unreacted primary and secondary amines in the polyaminoamide resin are then reacted with a polychlorohydrin derivative. Suitable polychlorohydrin derivatives are chlorine-terminated alkoxylated polyols having at least 1.5 chlorine end-groups, on average, and from at least 2 up to about 200 moles of alkoxylate. The alkoxylate preferably has a ratio of ethylene oxide:propylene oxide in the range of about 25:1 to about 4:1, respectively. Suitable polyols include, for example, glycerol, trimethylol propane, pentaerythritol, dipentaerythritol, and mixtures thereof. Preferably, a polychlorohydrin derivative of pentaerythritol ethoxylate is employed which is formed by reacting about 4 moles of epichlorohydrin with about 1 mole of pentaerythritol ethoxylate having from about 3 to about 120 moles of ethylene oxide, using a boron trifluoride etherate as a catalyst. This reaction is preferably followed by partially reacting the formed derivative with a $C_{6-20}$ amine at a chlorine:amine molar ratio of from about 10:1 to about 5:1, respectively.

The crosslinking reaction is conducted in a water-soluble solvent, at a reaction temperature of from about 25° to 100°, preferably from about 50° to 80° C., and most preferably from about 60° to 70° C. Suitable solvents include, for example, water or water soluble solvents such as ethylene glycol, diethylene glycol, propylene glycol, and the like.

The polyaminoamide is reacted with the polychlorohydrin derivative, preferably in water, at a reaction solids content of from about 0.1 to about 60%, and preferably from about 10 to about 35% solids. The polychlorohydrin derivative and polyaminoamide resin have a chlorine:nitrogen mole reaction ratio of from about 0.1:1.0 to about 2.5:1, and preferably about 1:1, respectively. The reaction is allowed to proceed until all of the polychlorohydrin derivative has reacted with the unreacted amine groups of the polyaminoamide and a solution viscosity at about 15% solids of at least about 20 cps at 25° C., as measured using a Brookfield Viscosimeter, is achieved. The crosslinked thermosetting resin thus formed is then stabilized by adjusting the solution pH to less than 9, and preferably from about 2 to 4, with acid.

As was noted above, the concentration of the polyaminoamide and polychlorohydrin derivative reactants in the solvent is from about 0.1 to about 60% by weight, preferably from about 15 to 35% by weight, and most preferably about 15% by weight, all weights being based on the weight of the crosslinked thermosetting resin.

The present invention also provides a process for making an antistatic composition capable of being permanently affixed onto a natural or synthetic polymeric textile substrate. The process involves reacting the above-disclosed polyaminoamide and polychlorohydrin derivative to form the crosslinked thermosetting resin, per the conditions disclosed above.

There is also provided a process for permanently treating a natural or synthetic polymeric textile substrate with an antistatic composition involving contacting the substrate with the antistatic composition of the invention. Polymeric substrates onto which the antistatic composition of the present invention may be applied include, for examples, nylon (polyamide), polycarbonate, polyphenylene oxide, polyester, polyolefins and the like, as well as blends thereof with various other compatible resins.

The composition and process of the present invention may also be employed to dissipate an electrostatic sharge on a static prone natural or synthetic polymeric substrate, thereby imparting a desired level of surface conductivity onto formed articles of manufacture such as, for example, various automobile parts. Permanent surface conductivity can be provided in either of two ways. One is by contacting the exterior surfaces of the already formed articles of manufacture with the antistatic composition of the present invention. The other is by blending from about 0.1 to about 10% by weight, based on the weight of the hot melt polymeric substrate, of the antistatic composition with the hot melt substrate used to make the article of manufacture prior to its being formed (cast). The finished article of manufacture thus contains the antistatic composition dispersed throughout its matrix.

The present invention will be better understood from the examples which follow, all of which are intended to be illustrative only and not meant to unduly limit the scope of the invention. Unless otherwise indicated, percentages are on a weight-by-weight basis.

I. Preparation of Polyaminoamide resin

EXAMPLE A

To a resin reactor was charged one mole of a dibasic acid ester mixture containing 65% dimethyl glutarate and 35% dimethyl adipate and one mole of diethylenetriamine. Stirring and nitrogen sparge was started with the contents of the reactor being heated to about 150° C.–160° C. Methanol started to reflux in the reactor at about 157° C. The reflux was allowed to continue until the reaction temperature reached about 85° C., at which time the methanol was distilled off. The reaction temperature was maintained at about 150° C.–160° C. for approximately 3 hours, the time required for distillation of about 85% of the theoretical amount of methanol. The Brookfield viscosity (spindle #2 at 30 rpm at 25° C.) of a 48.4% aqueous solution of the resin thus obtained was 705 cps. The pH of the resin solution was about 10.0. The total alkalinity of the resin solution was 133.8 mg KOH/gram.

EXAMPLE B

To a resin reactor was charged 3.71 moles of a dibasic acid ester mixture containing 65% dimethyl glutarate and 35% dimethyl adipate, 0.07 moles of EMPOL® 1008, a $C_{36}$ dimer acid available from Henkel Corp., and 3.78 moles of diethylenetriamine. Stirring and nitrogen sparge was started with the contents of the reactor being heated to about 170° C. Methanol started to reflux in the reactor at about 146° C., and was collected as it distilled off. Once the reactants reached a temperature of 177° C., the reaction contents were allowed to react until about 98% of the theoretical amount of methanol was removed by distillation. The Brookfield viscosity (spindle #2 at 30 rpm at 25° C.) of a 34.7% aqueous solution of the resin thus obtained was 147 cps. The pH of the resin solution was about 9.8. The total alkalinity of the resin solution was 94.76 mg KOH/gram.

EXAMPLE C

To a resin reactor was charged 3.71 moles of a dibasic acid ester mixture containing 65% dimethyl glutarate, 35% dimethyl adipate, 0.07 moles of EMPOL® 1008, 2.83 moles of diethylenetriamine, and 0.94 moles JEFFAMINE® EDR-192, a polyethylenoxide diamine having 4 moles of ethylene oxide, available from Huntsman Corporation. Stirring and nitrogen sparge was started with the contents of the reactor being heated to about 177° C. Methanol started to reflux in the reactor at about 139° C., and was collected as it distilled off. Once the temperature of the reactants reached 177° C., the reaction contents were allowed to react until about 94% of the theoretical amount of methanol was removed by distillation. The Brookfield viscosity (spindle #2 at 30 rpm at 25° C.) of a 50.7% aqueous solution of the resin thus obtained was 2,440 cps. The pH of the resin solution was about 10.2. The total alkalinity of the resin solution was 99.00 mg KOH/gram.

II. Preparation of Polychlorohydrin Derivatives

EXAMPLE D

To a reaction flask were charged 174.0 grams of PEG-600 having a hydroxyl value of about 180 mg KOH/gram and 100 grams of toluene. The contents in the flask were heated to reflux (about 119° C.) and moisture was distilled off. After removing about 22.7 grams of azeotrope (water-toluene mixture), the reaction contents were cooled to about 40° C. 1.7 grams of boron trifluoride-etherate was added and 51.7 grams of epichlorohydrin were added at a rate such that a reaction temperature between 60°–70° C. was maintained throughout the addition. The reaction contents were held at 70° C. until all epichlorohydrin was reacted. Next added to the reaction flask was 19.2 grams of a 25% aqueous solution of sodium hydroxide and 9.6 grams of lauryl amine. Heat was applied and the remaining toluene was distilled off at 150° C. The reaction product was filtered to remove insoluble salts while hot. The active chlorine in the product was calculated to be 7.95%.

EXAMPLE E

To a reaction flask were charged 100.0 grams of a pentaerythritol ethoxylate having a hydroxyl value of about 41.44 mg KOH/gram and 60.0 grams of toluene. The contents in the flask were heated to reflux (about 119° C.) and moisture was distilled off. After removing about 21.8 grams of azeotrope (water-toluene mixture), the reaction contents were cooled to about 58° C. 0.8 grams of boron trifluoride-etherate and 6.8 grams of epichlorohydrin were added. The reaction contents were heated to 70° C. and held at this temperature until all epichlorohydrin was reacted. Next added to the reaction flask was 4.8 grams of a 25% aqueous solution of sodium hydroxide and 4.3 grams of lauryl amine. Heat was applied and the remaining toluene was distilled off at 150° C. The reaction product was diluted with water to achieve a 50.0% solids solution. The active chlorine in the solids product was calculated to be 1.62%.

EXAMPLE F

To a reaction flask were charged 200.0 grams of PEG-600 having a hydroxyl value of about 187 mg KOH/gram and 2.0 grams of boron trifluoride acetic acid complex. The contents of the flask were heated to 70° C. at which time 61.7 grams of epichlorohydrin were added at a rate such that a reaction temperature between 60°–70° C. was maintained throughout the addition. The reaction contents were held at 70° C. until all epichlorohydrin was reacted. Next added to the reaction flask was 2.0 grams of a 25% aqueous solution of sodium hydroxide followed by heating to 125° C. The temperature of 125° C. was maintained for about one hour before the reaction product was filtered to remove insoluble salts while hot. The active chlorine in the product was calculated to be 9.08%.

EXAMPLE G

To a reaction flask were charged 100.0 grams of PEG-1450 having a hydroxyl value of about 77.4 mg KOH/gram and 1.2 grams of boron trifluoride acetic acid complex. The contents of the flask were heated to 70° C. at which time 12.8 grams of epichlorohydrin were added at a rate such that a reaction temperature between 60°–70° C. was maintained throughout the addition. The reaction contents were held at 70° C. until all epichlorohydrin was reacted. Next added to the reaction flask was 6.3 grams of a 25% aqueous solution of sodium hydroxide and 2.3 grams of lauryl amine followed by heating to 125° C. The temperature of 125° C. was maintained for about one hour before the reaction product was filtered to remove insoluble salts while hot. The active chlorine in the product was calculated to be 3.62%.

EXAMPLE H

To a reaction flask were charged 100.0 grams of PEG-200 having a hydroxyl value of about 543 mg KOH/gram and 1.2 grams of boron trifluoride acetic acid complex. The contents of the flask were heated to 70° C. at which time 89.6 grams of epichlorohydrin were added at a rate such that a reaction temperature between 60°–70° C. was maintained throughout the addition. The reaction contents were held at 70° C. until all epichlorohydrin was reacted. Next added to the reaction flask was 17.7 grams of a 25% aqueous solution of sodium hydroxide and 7.6 grams of lauryl amine followed by heating to 125° C. The temperature of 125° C. was maintained for about one hour before the reaction product was filtered to remove insoluble salts while hot. The active chlorine in the product was calculated to be 16.12%.

III. Preparation of Crosslinked Resins

Example 1

To a resin reactor were charged 37.7 grams of a polyaminoamide resin made per the same process described in Example A, but having 51.3% solids and an aqueous solution alkalinity of 145.53 mg KOH/gram, 111.4 grams of water, and 50.6 grams of chlorohydrin D. The reactor contents were heated to 60° C., held at this temperature, and allowed to react until a Brookfield viscosity of a 15% solids solution of the reaction mixture reached 115 cps (spindle #2 at 60 rpm at 25° C.). After which, 386.6 grams of water was added followed by adjusting the pH of the aqueous resin solution to 2.6 with 96% sulfuric acid. The resulting resin solution had a Brookfield viscosity of 53 cps (spindle #2 at 60 rpm at 25° C.), a pH of 2.6, and a solids content of 13.2%.

EXAMPLE 2

To a resin reactor were charged 13.6 grams of polyaminoamide resin A, 279.6 grams of water, 106.8 grams of chlorohydrin E, and 1.8 grams of a 25% aqueous solution of sodium hydroxide. The reactor contents were heated to 60° C., held at this temperature, and allowed to react until a Brookfield viscosity of the reaction solution reached 127 (spindle #2 at 60 rpm at 25° C.). After which, the pH of the aqueous resin solution was adjusted to 3.8 with 96% sulfuric acid. The resulting resin solution had a Brookfield viscosity of 127.5 cps (spindle #2 at 60 rpm at 25° C.), a pH of 4.0, and a solids content of 14.7%.

EXAMPLE 3

To a resin reactor were charged 12.0 grams of polyaminoamide resin A, 117.5 grams of water, 61.7 grams of chlorohydrin G, and 1.6 grams of 25% aqueous sodium hydroxide solution. The reactor contents were heated to 60° C., held at this temperature, and allowed to react until a Brookfield viscosity of the reaction solution reached 24 cps (spindle #2 at 60 rpm at 25° C.). After which, 256.5 grams of water was added followed by adjusting the pH of the aqueous resin solution to 6.6 with 96% sulfuric acid. The resulting resin solution had a Brookfield viscosity of 24 cps (spindle #2 at 60 rpm at 25° C.), a pH of 6.6, and a solids content of 15.0%.

EXAMPLE 4

To a resin reactor were charged 41.4 grams of polyaminoamide resin A, 98.6 grams of water, 47.6 grams of chlorohydrin H, and 5.5 grams of 25% aqueous sodium hydroxide solution. The reactor contents were heated to 60° C., held at this temperature, and allowed to react until a Brookfield viscosity of a 15% solids solution of the reaction mixture reached 25 cps (spindle #2 at 60 rpm at 25° C.). After which, 256.5 grams of water was added and the reaction was allowed to continue at 60° C. until a Brookfield viscosity of 85 cps was reached (spindle #2 at 60 rpm at 25° C.) and then the pH of the aqueous resin solution was adjusted to 2.8 with 96% sulfuric acid. The resulting resin solution had a Brookfield viscosity of 85 cps (spindle #2 at 60 rpm at 25° C.), a pH of 2.8, and a solids content of 16.0%.

EXAMPLE 5

To a resin reactor were charged 19.0 grams of polyaminoamide resin A, 76.9 grams of water, 38.9 grams of chlorohydrin F, and 2.6 grams of 25% aqueous sodium hydroxide solution. The reactor contents were heated to 60° C., held at this temperature, and allowed to react until a Brookfield viscosity of a 15% solids solution of the reaction mixture reached 70 cps (spindle #2 at 60 rpm at 25° C.). After which, 180.3 grams of water was added and the pH of the aqueous resin solution was adjusted to 2.3 with 96% sulfuric acid. The resulting resin solution had a Brookfield viscosity of 73 cps (spindle #2 at 60 rpm at 25° C.), a pH of 2.3, and a solids content of 17.0%.

Comparative Example A

Agefloc® PC-40, an antistatic agent based on a cationic polymer containing a polydiallyldimethylammonium chloride available from CPS Chemical Company.

Comparative Example B

To a resin reactor were charged 50.0 grams of chlorohydrin D, 46.3 grams of water, 7.2 grams of 25% aqueous sodium hydroxide solution, and 3.5 grams of dipropylene triamine. The reactor contents were heated to 65° C., held at this temperature, and allowed to react until a Brookfield viscosity of the reaction mixture reached 3,000 cps (spindle #3 at 12 rpm at 25° C.). After which, 119.6 grams of water was added and the pH of the aqueous resin solution was adjusted to 5.5 with 96% sulfuric acid. The resulting resin solution had a Brookfield viscosity of 875 cps (spindle #2 at 12 rpm at 25° C.), a pH of 5.5, and a solids content of 25.0%.

Resistivity Data

The composition of Examples 1–5, along with Comparative Examples A and B were diluted with water to about 1% of solids. The pH of the solution was adjusted to about 7. Nylon 6,6 fabric was scoured by: (a) 10 minute immersion in 60° C. isopropanol; (b) 20 minute immersion in 80° C. deionized water; (c) a second immersion in 80° C. deionized water; (d) air or oven dry; (e) cool to room temperature. The scoured nylon is immersed in the 1% solution of the examples for 20 sec, wrung, and air dried. The dried, treated fabric is cured for approximately 3 sec at 180° C. The cured samples are equilibrated overnight in a 47% relative humidity cabinet (27° C.). After equilibration the surface resistivity values are determined using a Milli-to-2 Wide Range Resistance Meter with an Electro-Tech Systems, Inc., Model 803A, surface/volume resistivity probe. The treated substrates were then subjected to two 80° C. deionized water immersions of 20 min each, which would typically result in the extraction of the antistatic composition. Resistivity were then again performed, per the above method, to determine the permanence of the antistatic composition after the above-described subsequent treatments. The surface resistance data are reported as the base 10 logarithm of the surface resistance measured in ohms. In these tests, increases in the Log(R) value of about 1.0 Log(R) units, or less, after the washing process show permanence of the anti-static agent. Initial and subsequent resistivity results are shown in Table I below.

TABLE I

| Example | Log R at 47% Relative Humidity | |
|---|---|---|
|  | Initial | After Washings |
| Blank | 14.3 | 14.3 |
| 1 | 10.8 | 12.5 |
| 2 | 11.6 | 12.4 |
| 3 | 11.7 | 12.3 |
| 4 | 12.2 | 13.1 |
| 5 | 11.5 | 12.7 |
| Comparative Example A | 11.4 | 14.0 |
| Comparative Example B | 10.6 | 14.2 |

As can be seen from the results obtained in Table I, an antistatic composition in accordance with the present invention is significantly more permanent, as compared to those known in the art. Those polymeric substrates treated with the disclosed antistatic composition provide adequate static electricity dissipating properties even after they are subjected to various treatment steps which would normally cause the antistatic composition to be extracted from the polymeric textile substrate.

What is claimed is:

1. An antistatic composition comprising a crosslinked thermosetting resin formed by reacting, in the presence of a water-soluble solvent, (a) a polyaminoamide having unreacted primary and secondary amine groups and (b) a polychlorohydrin derivative which is a chlorine-terminated alkoxylated polyol having, on average, at least 1.5 chlorine end groups and from 2 to about 200 moles of alkoxylate, wherein the polyol is selected from the group consisting of glycerol, trimethylol propane, pentaerythritol, dipentaerythritol, and mixtures thereof; and wherein said resin consists of the reaction product of components (a) and (b).

2. The composition of claim 1 wherein said unreacted primary and secondary amine groups of said polyaminoamide are reacted with said polychlorohydrin derivative in a mole ratio of chlorine:unreacted amine groups of from about 0.1:1.0 to about 2.5:1, respectively.

3. The composition of claim 1 wherein said crosslinked thermosetting resin is present at a concentration of from about 0.1 to about 60% by weight, based on the weight of said composition.

4. The composition of claim 3 wherein said crosslinked thermosetting resin is present at a concentration of from about 10 to about 35% by weight, based on the weight of said composition.

5. The composition of claim 1 wherein said alkoxylate is selected from the group consisting of ethylene oxide, propylene oxide, butylene oxide, and mixtures thereof.

6. The composition of claim 5 wherein said alkoxylate has a ratio of ethylene oxide:propylene oxide in the range of about 25:1 to about 4:1, respectively.

7. The composition of claim 1 wherein said polychlorohydrin derivative is prepared by reacting epichlorohydrin with a pentaerythritol ethoxylate in a molar ratio of about 1:1, respectively, using a boron trifluoride etherate catalyst to form a reaction product, followed by partially reacting said reaction product with $C_{6-20}$ amine at a chlorine:amine ratio of from about 0:1 to about 5:1, respectively.

8. The composition of claim 1 wherein said composition has a solution viscosity of at least 20 cps at 25° C.

9. The composition of claim 1 wherein the composition has a pH of less than 9.

10. The composition of claim 9 wherein the composition has a pH of from about 2 to about 4.

11. The composition of claim 1 wherein said solvent is water.

12. The composition of claim 2 wherein said mole ratio of chlorine:unreacted amine groups is 1:1, respectively.

13. The composition of claim 1 further comprising reacting said crosslinked thermosetting resin with a $C_{6-20}$ amine at a chlorine:amine molar ratio of from about 10:1 to about 5:1.

14. A process for producing an antistatic composition containing a crosslinked thermosetting resin comprising the steps of:
  (a) forming a polyaminoamide having unreacted primary and secondary amine groups;
  (b) reacting, in the presence of a water-soluble solvent, said polyaminoamide with a polychlorohydrin derivative which is a chlorine-terminated alkoxylated polyol having, on average, at least 1:5 chlorine end groups and from 2 to about 200 moles of ethoxylate, wherein the polyol is selected from the group consisting of glycerol, trimethylol propane, pentaerythritol, dipentaerythritol, and mixtures thereof; and wherein the resulting crosslinked thermosetting resin consists of the reaction product of the polyaminoamide and the polychlorohydrin derivative.

15. The process of claim 14 wherein said unreacted primary and secondary amine groups of said polyaminoamide are reacted with said polychlorohydrin derivative in a mole ratio of chlorine:unreacted amine groups of from about 0.1:1.0 to about 2.5:1.0, respectively.

16. The process of claim 14 wherein said crosslinked thermosetting resin is present at a concentration of from about 0.1 to about 60% by weight, based on the weight of said composition.

17. The process of claim 16 wherein said crosslinked thermosetting resin is present at a concentration of from about 10 to about 35% by weight, based on the weight of said composition.

18. The process of claim 14 wherein said polychlorohydrin derivative is prepared by reacting epichlorohydrin with a pentaerythritol ethoxylate in a molar ratio of about 1:1, respectively, using a boron trifluoride etherate catalyst to form a reaction product, followed by partially reacting said reaction product with a $C_{6-20}$ amine at a chlorine:amine ratio of from about 10:1 to about 5:1, respectively.

19. The process of claim 14 wherein said composition has a solution viscosity of about 20 cps at 25° C.

20. The process of claim 14 wherein the composition has a pH of less than 9.

21. The process of claim 14 wherein the composition has a pH of from about 2 to about 4.

22. The process of claim 14 wherein said solvent is water.

23. The process of claim 15 wherein said mole ratio of chlorine:unreacted amine groups is 1:1, respectively.

24. The process of claim 14 further comprising reacting said crosslinked thermosetting resin with a $C_{6-20}$ amine at a chlorine:amine molar ratio of from about 10:1 to about 5:1.

25. The process of claim 14 wherein said step (b) is conducted at a temperature of from about 25° to about 100° C.

* * * * *